United States Patent
Park

(10) Patent No.: US 9,254,803 B2
(45) Date of Patent: Feb. 9, 2016

(54) APPARATUS FOR PROTECTING PASSENGER OF AUTOMBILE AND CONTROL METHODLAMP

(71) Applicant: HYUNDAI MOBIS Co., Ltd., Yongin-si, Gyeonggi-do (KR)

(72) Inventor: Tae Won Park, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/287,301

(22) Filed: May 27, 2014

(65) Prior Publication Data

US 2015/0151702 A1    Jun. 4, 2015

(30) Foreign Application Priority Data

Nov. 29, 2013 (KR) .................. 10-2013-0147289

(51) Int. Cl.
*B60R 22/00* (2006.01)
*B60R 21/0132* (2006.01)
*B60R 21/01* (2006.01)
*B60R 21/013* (2006.01)

(52) U.S. Cl.
CPC ... *B60R 21/0132* (2013.01); *B60R 2021/01013* (2013.01); *B60R 2021/01286* (2013.01); *B60R 2021/01315* (2013.01)

(58) Field of Classification Search
CPC .................... B60R 21/0132; B60R 2021/0004
USPC .................. 701/45, 36, 46, 49, 301; 180/282; 340/436
See application file for complete search history.

(56) References Cited

U.S. PATENT DOCUMENTS

| 6,512,969 B1 * | 1/2003 | Wang ............................... 701/45 |
| 2009/0008915 A1 * | 1/2009 | Baumann et al. ............. 280/734 |

* cited by examiner

*Primary Examiner* — Luke Huynh
(74) *Attorney, Agent, or Firm* — Paratus Law Group, PLLC

(57) ABSTRACT

Provided is an apparatus for protecting a passenger of an automobile, including: an automobile body; a biaxial FIS sensor mounted at a front center of the automobile body to sense decelerations on an X axis which is in a length direction of the automobile body and a Y axis which is in a width direction of the automobile body during an automobile impact; a deceleration meter sensing a first deceleration during the automobile impact; and a controller determining an airbag splaying time based on a displacement value and a predicted displacement value moving forward from an initial position of the passenger calculated based on the first deceleration, and an X-axial velocity variation and a Y-axial velocity variation measured from the biaxial FIS sensor.

16 Claims, 7 Drawing Sheets

(a)　　　　　　　　　(b)　　　　　　　　　(c)

(a)　　　　　　　　(b)

APPARATUS FOR PROTECTING PASSENGER OF AUTOMBILE AND CONTROL METHODLAMP

CROSS-REFERENCE TO RELATED APPLICATIONS

The present application claims priority to Korean Patent Application Number 10-2013-0147289 filed Nov. 29, 2013, the entire contents of which application is incorporated herein for all purposes by this reference.

TECHNICAL FIELD

The present invention relates to an apparatus for protecting a passenger of an automobile and a control method, and more particularly, to an apparatus for protecting a passenger of an automobile and a control method that calculate an optimized airbag splaying time by using a biaxial FIS sensor.

BACKGROUND

Generally, various safety devices for protecting a driver and a passenger against unexpected situations which may occur at some time are provided in an automobile, and representatively, an airbag device for directly protecting the driver and the passenger seated in a front seat of the automobile is included.

When an impact to the automobile occurs, compression gas is momentarily injected into the airbag by impact force and thus, the air bag device covers front sides of the driver and the passenger in the front seats while the airbag is expanded at a rapid speed to protect the driver and the passenger from windshield glass of the automobile or a front object.

Generally, a representative type of front impact includes 100% front, offset, oblique, or pole impacts. In the case where a passenger restriction device is controlled by using a deceleration measured by an air-bag control unit (ACU) mounted in a passenger boarding chamber, performance of the 100% front and pole impacts may be secured, but performance of the offset and oblique impacts is hardly secured. In the case of the offset and oblique impacts, even though an impact degree is severe, a magnitude of the deceleration in the ACU which occurs at an early stage of the impact is not large, and as a result, it is difficult to control the passenger restriction device.

In order to solve the problem, a front impact sensor (FIS) is mounted on the front of the automobile. The FIS is used to sense the deformation of the front of the automobile at the early stage while mounted at the front of the automobile. The passenger restriction device is controlled by using the deceleration obtained therefrom together. Further, in order to prevent a malfunction of the passenger restriction device due to a malfunction of the sensor, a separate shaping sensor is mounted to operate the passenger restriction device only when the shaping sensor determines the impact.

In the case of using the FIS, the performance of the offset and oblique impact may be secured, but there is a problem as follows. Since the sensor is mounted at the front of the automobile, the sensor during the impact is broken or a wire harness connecting the sensor and the ACU may be cut. Further, there is a problem in that cost is increased due to the addition of two left and right FISs and the wire harness.

SUMMARY

The present invention has been made in an effort to provide an apparatus for protecting a passenger of an automobile and a control method having advantages of calculating an optimized airbag splaying time by using a biaxial FIS sensor.

The objects of the present invention are not limited to the aforementioned objects, and other objects, which are not mentioned above, will be apparent to those skilled in the art from the following description.

An exemplary embodiment of the present invention provides an apparatus for protecting a passenger of an automobile, including: an automobile body; a biaxial FIS sensor mounted at a front center of the automobile body to sense decelerations on an X axis which is in a length direction of the automobile body and a Y axis which is in a width direction of the automobile body during an automobile impact; a deceleration meter sensing a first deceleration during the automobile impact; and a controller determining an airbag splaying time based on a displacement value and a predicted displacement value moving forward from an initial position of the passenger calculated based on the first deceleration, and an X-axial velocity variation and a Y-axial velocity variation measured from the biaxial FIS sensor.

Other detailed contents of the exemplary embodiments are included in the description and drawings.

According to the exemplary embodiments of the present invention, there are one or more effects as follows.

By using the biaxial FIS sensor, it is possible to reduce the number of components as compared with an existing apparatus for protecting a passenger using two FIS sensors. Further, it is possible to reduce costs according to deletion of a sensor and a wire harness.

The effects of the present invention are not limited to the aforementioned effects, and other effects, which are not mentioned above, will be apparent to those skilled in the art from the description included in the appended claims.

DETAILED DESCRIPTION

Figure 1:
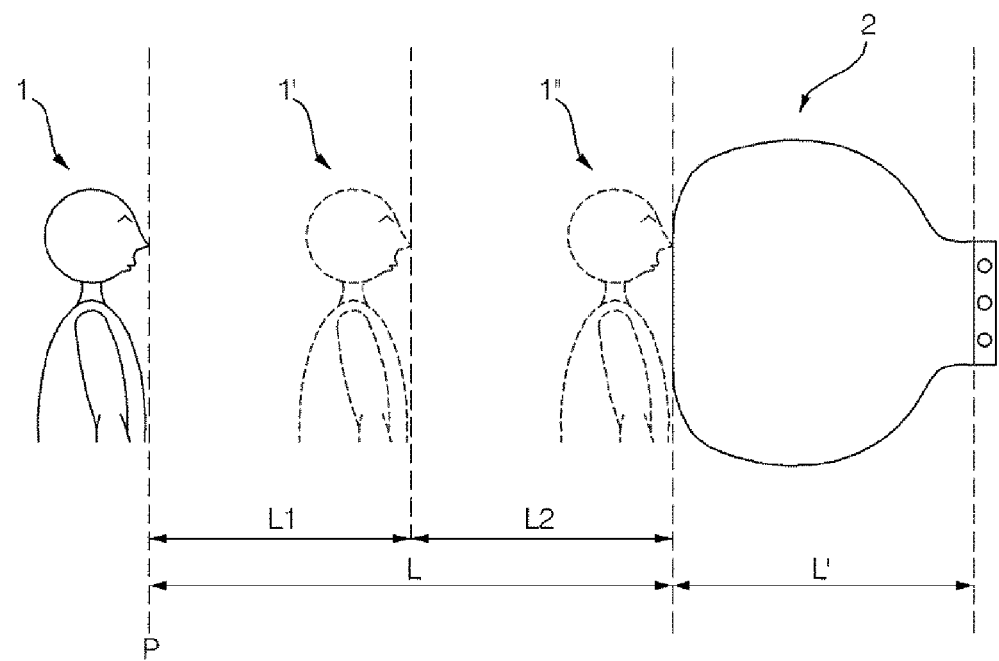
FIG. 1 is a diagram illustrating a displacement value and a predicted displacement value moving forward from a passenger during a front impact of an automobile.

Various advantages and features of the present invention and methods accomplishing them will become apparent from exemplary embodiments described below in detail with reference to the accompanying drawings. However, the present invention is not limited to the exemplary embodiment disclosed herein but will be implemented in various forms. The exemplary embodiments introduced herein are provided to make disclosed contents thorough and complete and sufficiently transfer the spirit of the present invention to those skilled in the art. Therefore, the present invention will be defined only by the appended claims. Like reference numerals indicate like elements throughout the specification.

In the specification, dividing names of components into first, second, and the like is to divide the names because the names of the components are the same as each other and an order thereof is not particularly limited in the following description.

Hereinafter, an apparatus for protecting a passenger of an automobile will be described in detail with reference to the accompanying drawings.

FIG. 1 is a diagram illustrating a displacement value and a predicted displacement value moving forward from a passenger during a front impact of an automobile. In FIG. 1, reference numeral 1 is a passenger before an automobile impact, and reference numerals 1' and 1" are passengers after the automobile impact.

Referring to FIG. 1, in order to protect the passenger 1 by a splayed airbag 2 at the time of a front impact of the automobile, the airbag needs to start to operate within a time obtained by subtracting a time required when the airbag moves by a distance L' where the airbag is splayed after the airbag starts to operate from a time required when the passenger moves by a distance L from an initial position P of the passenger 1 to the splayed airbag 2. For example, the time required when the passenger moves by the distance L from the initial position P of the passenger 1 to the splayed airbag 2 is 0.5 second and the time required when the passenger moves by a distance L' where the air bag is splayed after the airbag starts to operate is 0.3 second, only when the airbag starts to operate within 0.2 second which is a time obtained by subtracting 0.3 second from 0.5 second, the passenger 1 may be protected by the splayed airbag 2.

However, when a front impact of the vehicle actually occurs, the passenger 1 moves forward before the airbag starts to operate, and as a result, a time required when the passenger moves by the distance L up to the splayed airbag 2 is shortened as much. That is, the time required when the passenger 1 moves by the distance L' where the air bag is splayed after the airbag starts to operate has a predetermined value as 0.3 second, while the time required when the passenger 1 moves by the distance L to the splayed airbag 2 is shortened, and as a result, the passenger 1 contacts the airbag which is not yet splayed and the airbag does not effectively protect the passenger 1.

That is, in order to protect the passenger 1 by the splayed airbag 2, it is necessary to predict a moving distance L2 of the passenger for the time required to the distance L' splayed after the airbag starts to operate. Hereinafter, while a moving distance L1 of the passenger before the airbag starts to operate after the front impact of the automobile occurs is called a displacement value L1, and a moving distance L2 of the passenger after the airbag starts to operate is called a predicted displacement value L2, the description will be made.

As described above, in order to protect the passenger 1 by the splayed airbag 2, at a time when a sum of the displacement value L1 and the predicted displacement value L2 becomes the distance L from the initial position P of the passenger 1 to the splayed airbag 2, the airbag starts to operate.

Figure 2:
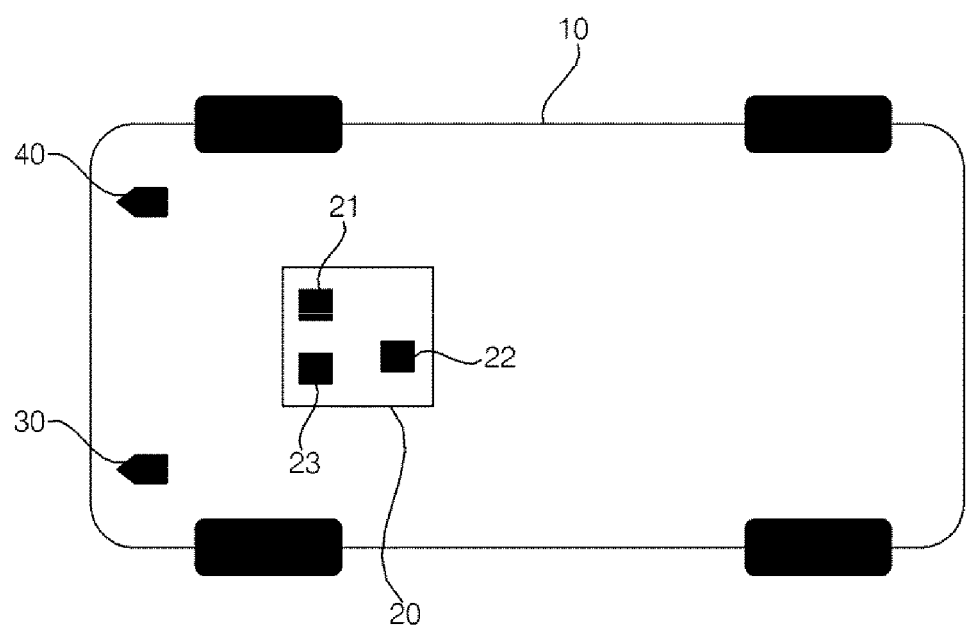
FIG. 2 is a diagram illustrating a general apparatus for protecting a passenger of an automobile.
Figure 3:
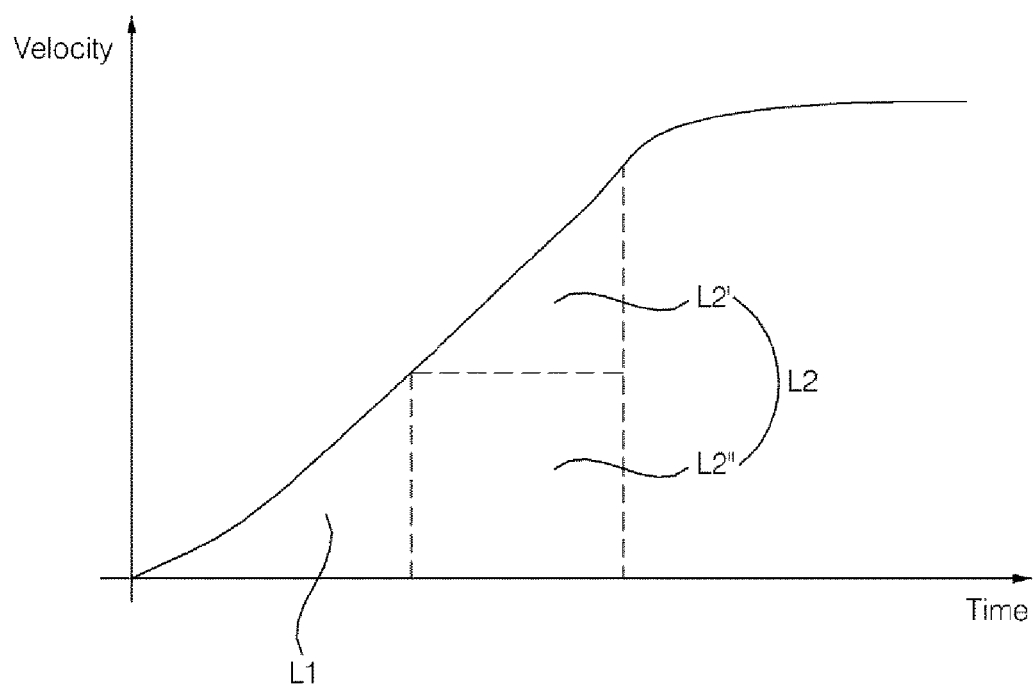
FIG. 3 is a function graph illustrating a displacement value and a predicted displacement value of a passenger in the general apparatus for protecting the passenger of the automobile.

FIG. 2 is a diagram illustrating a general apparatus for protecting a passenger of an automobile, and FIG. 3 is a function graph illustrating a displacement value and a predicted displacement value of a passenger in the general apparatus for protecting the passenger of the automobile.

Referring to FIGS. 2 and 3, an operation of a general apparatus for protecting a passenger of an automobile will be described below.

Referring to FIG. 2, the general apparatus for protecting the passenger of the automobile includes a deceleration meter 21 sensing a first deceleration in a length direction of an automobile 10 during a front impact of the automobile 10, a horizontal acceleration sensor 22 sensing a second deceleration in a width direction of the automobile 10 during the front impact of the automobile 10, left and right front impact sensors 30 and 40 disposed at the front of the automobile 10 to sense third and fourth decelerations at the left and right sides of the automobile 10 during the front impact of the automobile 10, a shaping sensor 23 sensing an average deceleration of the automobile 10, and a controller 20 controlling whether the airbag is splayed or not based on the first, second, third, and fourth decelerations and the average deceleration.

The deceleration meter 21, the horizontal acceleration sensor 22, and the shaping sensor 23 may be included in the controller 20, but are not limited thereto.

The deceleration meter 21, the horizontal acceleration sensor 22, and the left and right front impact sensors 30 and 40 sense the first, second, third, and fourth decelerations of the automobile 10 to transfer the sensed decelerations to the controller 20, and the shaping sensor 23 senses the average deceleration of the automobile 10 to transfer the sensed average deceleration to the controller 20.

Referring to FIGS. 1 to 3, the controller 20 receives the first deceleration to calculate the displacement value L1 and the predicted displacement value L2 of the passenger during the front impact of the automobile 10 with an external object.

That is, the controller 20 calculates the displacement value L1 by integrating the first deceleration acquired through the deceleration meter 21 twice, and calculates the predicted displacement value L2 through a function at a velocity obtained by integrating the first deceleration once. The predicted displacement value L2 may be divided into a first predicted displacement value L2' and a second predicted displacement value L2", as illustrated in FIG. 3 for convenience of calculation.

The controller 20 determines a threshold value which is a variable value by using the displacement value L1, so that the airbag may operate when a sum of the displacement value L1, and the first predicted displacement value L2' and the second predicted displacement value L2" becomes the distance L between the initial position P of the passenger 1 and the splayed airbag 2.

Herein, the threshold value is an experimental value as a predetermined value varied according to the displacement value L1. The threshold value is a threshold value of the predicted displacement value L2 for comparison with the predicted displacement value L2. Accordingly, as the predicted displacement value L2 is divided into the first predicted displacement value L2' and the second predicted displacement value L2", the threshold value may be set as a plurality of values for comparison with the first predicted displacement value L2' and the second predicted displacement value L2".

The controller 20 may determine the threshold value by further using the second deceleration and the third and fourth decelerations.

The controller 20 compares the threshold value with the predicted displacement value L2 to primarily determine operating the airbag when the predicted displacement value L2 is larger than the threshold value.

However, when the moving distance of the passenger 1 does not exist or is small during an impact having a severity which is low not to splay the airbag or during bad road/obstacle driving. Accordingly, the displacement value L1 and the predicted displacement value L2 of the passenger 1 do not exist or are small.

That is, the controller 20 receives the average deceleration of the automobile 10 from the shaping sensor 23 in order to once more carefully determine whether the airbag operates or not to splay the airbag only when the average deceleration is larger than a predetermined threshold value.

Figure 4:
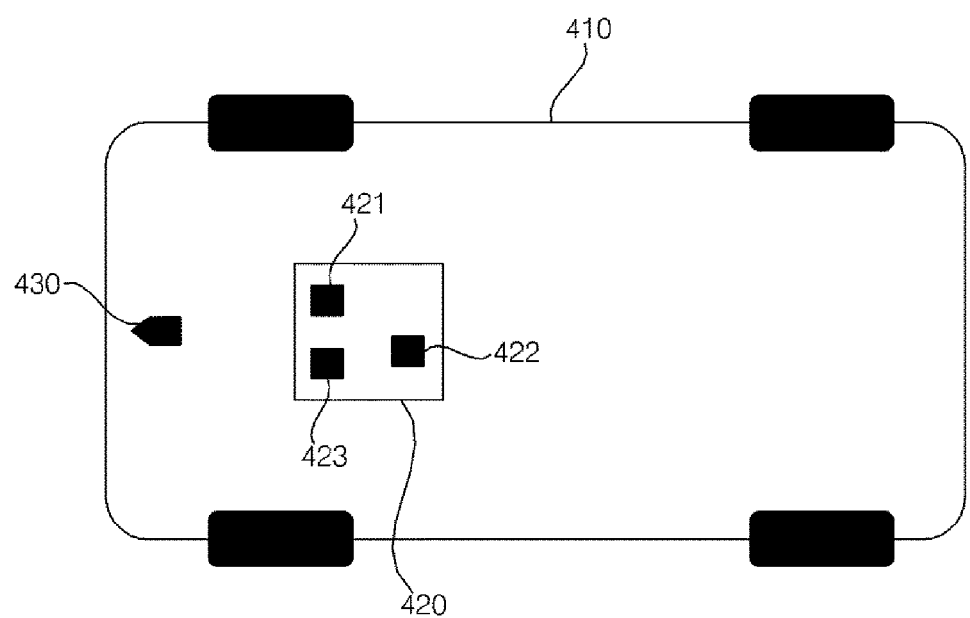
FIG. 4 is a diagram referred to describe an apparatus for protecting a passenger of an automobile according to an exemplary embodiment of the present invention.

FIG. 4 is a diagram referred to describe an apparatus for protecting a passenger of an automobile according to an exemplary embodiment of the present invention.

Referring to FIG. 4, an apparatus for protecting a passenger according to the exemplary embodiment of the present invention includes a deceleration meter 421 sensing a first deceleration in a length direction of an automobile 410 during a front impact of the automobile 410, a horizontal acceleration sensor 422 sensing a second deceleration in a width direction of the automobile 410 during the front impact of the automobile 410, a biaxial FIS sensor 430 mounted at the front center of the automobile 410 to sense decelerations on an X axis which is a length direction of the automobile and a Y axis which is a width direction of the automobile during the automobile impact, a shaping sensor 423 sensing an average deceleration of the automobile 410, and a controller 420 controlling an airbag based on the first and second deceleration, the deceleration on the X axis and the Y axis, and the average deceleration. Herein, the controller 420 may be an airbag control unit (ACU).

Herein, the biaxial FIS sensor may be an impact sensing sensor that is mounted at the front center of the automobile to simultaneously sense an X-axial impulse and a Y-axial impulse.

The deceleration meter 421, the horizontal acceleration sensor 422, and the shaping sensor 423 may be included in the controller 420, but are not limited thereto.

The controller 420 calculates the displacement value and the predicted displacement value moving forward from the initial position of the passenger based on the first deceleration of the automobile sensed through the deceleration meter 421 during the automobile impact. The controller 420 determines an airbag splaying time based on the X-axial velocity variation and the Y-axial velocity variation sensed through the biaxial FIS sensor 430. Herein, the X-axial velocity variation and the Y-axial velocity variation are proportional to the magnitude of the signal according to the deformation of an automobile body during the automobile impact.

The controller 420 determines a threshold value of the predicted displacement value, a threshold value of the X-axial velocity variation, and a threshold value of the Y-axial velocity variation based on the displacement value, and splays the airbag when the predicted displacement value is larger than the threshold value. Further, the controller 420 determines whether a shaping condition is satisfied or not to determine whether the airbag is splayed or not.

Figure 5:
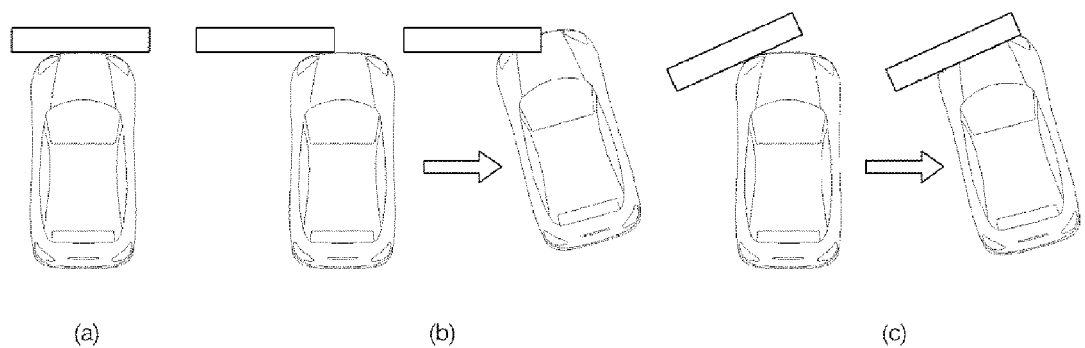
FIG. 5 is a diagram referred to describe a sensing operation of a biaxial FIS sensor according to a type of front impact.

FIG. 5 is a diagram referred to describe a sensing operation of a biaxial FIS sensor according to a type of front impact.

As illustrated in FIG. 5A, in the case of a 100% front impact, the deformation of the automobile body occurs in the X direction. Accordingly, the biaxial FIS sensor may sense an FIS X signal to splay the airbag. As illustrated in FIG. 5B, in the case of an offset impact, the deformation of the automobile body occurs in the X direction and the Y direction. Accordingly, the biaxial FIS sensor may sense FIS X and FIS Y signals to splay the airbag. As illustrated in FIG. 5C, in the case of an oblique impact, the deformation of the automobile body occurs in the X direction and the Y direction. Accordingly, the biaxial FIS sensor may sense FIS X and FIS Y signals to splay the airbag.

Figure 6:
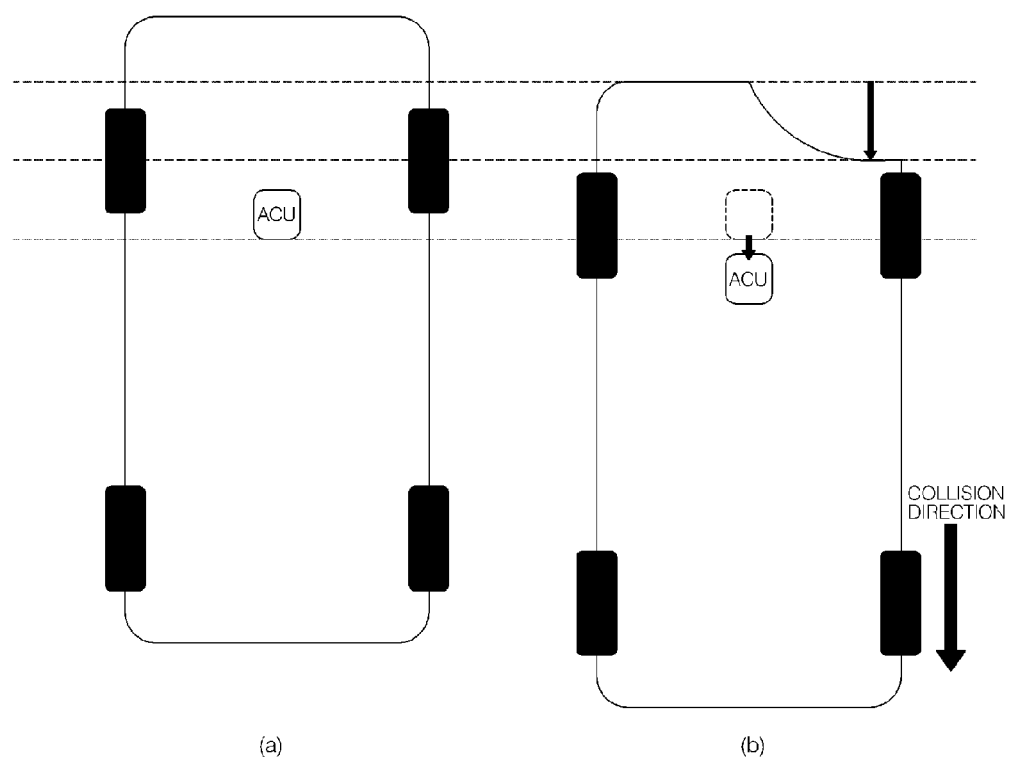
FIG. 6 is a diagram referred to describe an operation in which an X-axial velocity variation and a Y-axial velocity variation are proportional to a magnitude of a signal according to the deformation of an automobile body during an automobile impact according to an exemplary embodiment of the present invention.

FIG. 6 is a diagram referred to describe an operation in which an X-axial velocity variation and a Y-axial velocity variation are proportional to a magnitude of a signal according to the deformation of an automobile body during an automobile impact according to an exemplary embodiment of the present invention.

Passenger movement does not exist or is small during an impact having a severity which is low not to splay the airbag or during bad road/obstacle driving. Accordingly, since the displacement and the predicted displacement do not exist or are small, the apparatus for protecting the passenger of the automobile needs to be inoperative reliably.

In order to properly drive the apparatus for protecting the passenger of the automobile, better performance may be obtained by reflecting a deformation amount of the automobile body in addition to considering the behavior of the passenger.

For example, as illustrated in FIG. 6A, an impact small enough which does splay the airbag or during bad road/obstacle driving, the deformation of the front of the automobile does not exist or is small. On the other hand, as illustrated in FIG. 6B, in the case of an impact having high severity which requires splaying the airbag, the deformation of the front of the automobile largely occurs. As the severity of the impact is higher, the deformation of the front of the automobile is larger. According to an exemplary embodiment of the present invention, when the biaxial FIS sensor is mounted at the front center of the automobile, the deformation amount of the automobile body of the X-axial or Y-axial direction may be reflected. In the case of the impact having low severity, the biaxial FIS sensor signal is small or does not exist, and in the case of the impact having high severity, the biaxial FIS sensor signal is large.

Figure 7:
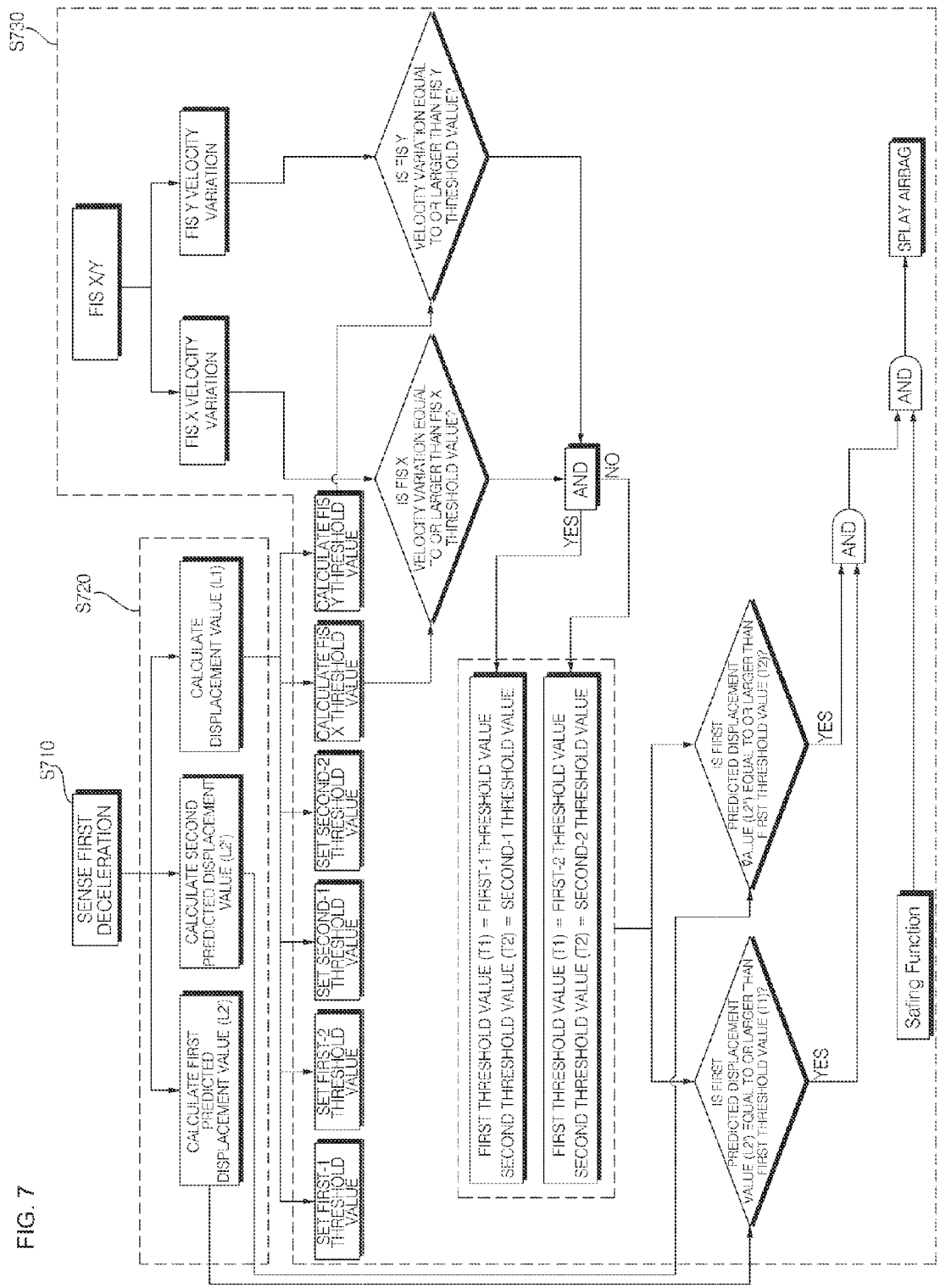
FIG. 7 is a flowchart to describe an operation of the controller in the apparatus for protecting a passenger of the automobile according to the exemplary embodiment of the present invention.

FIG. 7 is a flowchart to describe an operation of the controller in the apparatus for protecting a passenger of the automobile according to the exemplary embodiment of the present invention.

Referring to FIG. 7, the controller 420 receives a first deceleration of the automobile from the deceleration meter 421 (S710). The controller 420 calculates a displacement value and a predicted displacement value moving forward from an initial position of a passenger based on the first deceleration (S720). The controller 420 determines an airbag splaying time based on the displacement value, the predicted displacement value, and the X-axial velocity variation and the Y-axial velocity variation received from the biaxial FIS sensor (S730).

The predicted displacement value is calculated to be divided into a first predicted displacement value L2' and a second predicted displacement value L2" for convenience of calculation.

The controller 420 determines first threshold values T1 and T2 which are threshold values of the first predicted displacement value L2' based on a displacement value L1. The threshold values T1 and T2 are determined according to a comparison result of an X-axial velocity variation and a Y-axial velocity variation sensed through the biaxial FIS sensor.

The controller 420 sets the first threshold value T1 which is the threshold value of the first predicted displacement value L2' to a plurality of threshold values such as a first-1 threshold value and a first-2 threshold value based on a displacement value L1. Further, the controller 420 sets the second threshold value T2 which is the threshold value of the second predicted displacement value L2" to a plurality of threshold values such as a second-1 threshold value and a second-2 threshold value. Further, the controller 420 sets a threshold value of the X-axial velocity variation and a threshold value of the Y-axial velocity variation based on the displacement value L1. Herein, the first-1 threshold value, the first-2 threshold value, the second-1 threshold value, the second-2 threshold value, the threshold value of the X-axial velocity variation, and the threshold value of the Y-axial velocity variation are experimental values as predetermined values varied according to the displacement value L1.

Thereafter, the controller 420 compares the threshold value of the X-axial velocity variation with the X-axial velocity variation sensed by the biaxial FIS sensor, and compares the threshold value of the Y-axial velocity variation with the Y-axial velocity variation sensed by the biaxial FIS sensor. When the X-axial velocity variation is equal to or larger than the threshold value of the X-axial velocity variation and the Y-axial velocity variation is equal to or larger than the threshold value of the Y-axial velocity variation, the first-1 threshold value is determined as the first threshold value T1, and the second-1 threshold value is determined as the second threshold value T2.

Meanwhile, when the X-axial velocity variation is smaller than the threshold value of the X-axial velocity variation and the Y-axial velocity variation is smaller than the threshold value of the Y-axial velocity variation, the first-2 threshold value is determined as the first threshold value T1, and the second-2 threshold value is determined as the second threshold value T2.

Thereafter, the controller 420 compares the first predicted displacement value L2' with the first threshold value T1, and compares the second predicted displacement value L2" with the second threshold value T2. When the first predicted displacement value L2' is equal to or larger than the first threshold value T1 and the second predicted displacement value L2" is equal to or larger than the second threshold value T2, the controller 420 primarily determines whether to splay the airbag.

Thereafter, the controller 420 receives the average deceleration of the automobile 410 from the shaping sensor 423 to splay the airbag only when the average deceleration is larger than a predetermined threshold value in order to more carefully determine whether to splay the airbag.

While the exemplary embodiments of the present invention have been illustrated and described above, the present invention is not limited to the aforementioned specific exemplary embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

What is claimed is:

1. An apparatus for protecting a passenger of an automobile, comprising:
   an automobile body;
   a single biaxial Front Impact Sensor (FIS) mounted at a front center of the automobile body and sensing decelerations on an X axis which is in a length direction of the automobile body and a Y axis which is in a width direction of the automobile body during an automobile impact;
   a deceleration meter sensing a first deceleration in the length direction of the automobile body during the automobile impact; and
   a controller determining an airbag splaying time based on a displacement value and a predicted displacement value moving forward from an initial position of the passenger calculated based on the first deceleration, and an X-axial velocity variation and a Y-axial velocity variation measured by the single biaxial FIS.

2. The apparatus of claim 1, wherein the controller determines a threshold value of the X-axial velocity variation, and a threshold value of the Y-axial velocity variation by the displacement value, and compares the X-axial velocity variation with the threshold value of the X-axial velocity variation and compares the Y-axial velocity variation with the threshold value of the Y-axial velocity variation to determine a first threshold value and a second threshold value according to a comparison result.

3. The apparatus of claim 1, wherein the predicted displacement value includes a first predicted displacement related with the velocity of the automobile body and a second predicted displacement related with the velocity variation of the automobile body, and
   the controller controls the airbag to be splayed when the first predicted displacement is equal to or larger than a first threshold value and the second predicted displacement is equal to or larger than a second threshold value.

4. The apparatus of claim 1, further comprising:
   a horizontal acceleration sensor sensing a second deceleration in the width direction of the automobile body during the automobile impact,
   wherein the controller further includes the second deceleration to determine the airbag splaying time.

5. The apparatus of claim 1, wherein the single biaxial FIS is proportional to the magnitude of a signal according to the deformation of the automobile body during the automobile impact.

6. A control method of an apparatus for protecting a passenger of an automobile, comprising:
   receiving a first deceleration in a length direction of the automobile sensed in a deceleration meter;
   receiving an X-axial velocity variation which is in the length direction of the automobile and a Y-axial velocity variation which is in a width direction of the automobile from a single biaxial Front Impact Sensor (FIS) which is mounted at a front center of a automobile body;
   calculating a displacement value and a predicted displacement value moving forward from an initial position of the passenger based on the first deceleration; and
   determining an airbag splaying time based on the displacement value, the predicted displacement value, the X-axial velocity variation, and the Y-axial velocity variation.

7. The control method of claim 6, wherein the calculating is performed by dividing the predicted displacement value into a first predicted displacement value and a second predicted displacement value.

8. The control method of claim 7, wherein a sum of the first predicted displacement value and the second predicted displacement value is a distance between the initial position of the passenger of the automobile and the splayed airbag.

9. The control method of claim 6, wherein the determining includes:
   determining a threshold value of the X-axial velocity variation, and a threshold value of the Y-axial velocity variation by the displacement value;
   comparing the X-axial velocity variation with the threshold value of the X-axial velocity variation;
   comparing the Y-axial velocity variation with the threshold value of the Y-axial velocity variation; and determining a first threshold value and a second threshold value according to a comparison result of the X axis and the Y axis.

10. The control method of claim 6, wherein the predicted displacement value includes a first predicted displacement related with the velocity of the automobile and a second predicted displacement related with the velocity variation of the automobile, and the determining includes splaying the airbag when the first predicted displacement is equal to or larger than a first threshold value and the second predicted displacement is equal to or larger than a second threshold value.

11. The control method of claim 6, wherein the biaxial FIS is proportional to the magnitude of the signal according to the deformation of the automobile body during an automobile impact.

12. The control method of claim 6, wherein the predicted displacement value includes a first predicted displacement related with the velocity of the automobile and a second predicted displacement related with the velocity variation of the automobile, and the determining includes splaying the airbag when the first predicted displacement is equal to or larger than a first threshold value and the second predicted displacement is equal to or larger than a second threshold value.

13. The control method of claim 6, wherein the sensor is proportional to the magnitude of the signal according to the deformation of a automobile body during an automobile impact.

14. A control method of an apparatus for protecting a passenger of an automobile, comprising:

receiving a first deceleration in a length direction of the automobile sensed in a deceleration meter;

receiving an X-axial velocity variation which is in the length direction of the automobile and a Y-axial velocity variation which is in a width direction of the automobile from a sensor;

calculating a displacement value and a predicted displacement value moving forward from an initial position of the passenger based on the first deceleration; and determining an airbag splaying time based on the displacement value, the predicted displacement value, the X-axial velocity variation, and the Y-axial velocity variation, wherein the calculating is performed by dividing the predicted displacement value into a first predicted displacement value and a second predicted displacement value.

15. The control method of claim 14, wherein a sum of the first predicted displacement value and the second predicted displacement value is a distance between the initial position of the passenger of the automobile and the splayed airbag.

16. The control method of claim 14, wherein the determining includes:

determining a threshold value of the X-axial velocity variation, and a threshold value of the Y-axial velocity variation by the displacement value;

comparing the X-axial velocity variation with the threshold value of the X-axial velocity variation;

comparing the Y-axial velocity variation with the threshold value of the Y-axial velocity variation; and determining a first threshold value and a second threshold value according to a comparison result of the X axis and the Y axis.

\* \* \* \* \*